United States Patent
Kim et al.

(10) Patent No.: US 10,344,120 B2
(45) Date of Patent: Jul. 9, 2019

(54) HYDROLYSIS RESISTANT AND BIODEGRADABLE ALIPHATIC-AROMATIC COPOLYESTER RESIN COMPOSITION

(75) Inventors: Ki Cheol Kim, Jeonju-si (KR); Jung Hyun Choi, Cheongju-si (KR)

(73) Assignee: GIO-SOLTECH CO., LTD., Wonju-si (KR)

(*) Notice: Subject to any disclaimer, the term of this patent is extended or adjusted under 35 U.S.C. 154(b) by 755 days.

(21) Appl. No.: 14/238,214

(22) PCT Filed: Nov. 28, 2011

(86) PCT No.: PCT/KR2011/009124
§ 371 (c)(1),
(2), (4) Date: Jun. 1, 2014

(87) PCT Pub. No.: WO2012/165734
PCT Pub. Date: Dec. 6, 2012

(65) Prior Publication Data
US 2014/0288215 A1  Sep. 25, 2014

(30) Foreign Application Priority Data
Jun. 3, 2011 (KR) .................. 10-2011-0054171

(51) Int. Cl.
| C08G 63/54 | (2006.01) |
| C08G 63/60 | (2006.01) |
| C08K 3/26  | (2006.01) |
| C08K 3/34  | (2006.01) |
| C08L 3/02  | (2006.01) |
| C08L 67/02 | (2006.01) |

(52) U.S. Cl.
CPC ........... *C08G 63/54* (2013.01); *C08G 63/60* (2013.01); *C08K 3/26* (2013.01); *C08K 3/34* (2013.01); *C08K 3/346* (2013.01); *C08L 3/02* (2013.01); *C08L 67/02* (2013.01); *C08K 2003/265* (2013.01)

(58) Field of Classification Search
CPC ........ C08G 63/54; C08G 63/80; C08G 63/16; C08L 67/02; C08J 5/00
USPC .................................................. 524/604
See application file for complete search history.

(56) References Cited

U.S. PATENT DOCUMENTS

| 4,940,772 A |   | 7/1990 | Matsumoto et al. |
| 5,045,260 A | * | 9/1991 | Humbrecht ............... D01F 6/84 264/103 |
| 5,468,441 A |   | 11/1995 | Homann et al. |
| 2008/0161465 A1 | * | 7/2008 | Jenkins ................ C08G 63/547 524/403 |
| 2008/0188593 A1 | * | 8/2008 | Bastioli ................. C08G 63/16 524/35 |
| 2011/0039999 A1 | * | 2/2011 | Witt .................... C08G 18/4219 524/210 |
| 2011/0071238 A1 | * | 3/2011 | Bastioli ................ C08G 63/181 524/17 |
| 2011/0177275 A1 | * | 7/2011 | Morris .................... C08J 5/18 428/36.92 |
| 2011/0187029 A1 | * | 8/2011 | Dietrich ................. C08G 63/16 264/539 |
| 2011/0207859 A1 | * | 8/2011 | Hasty .................... C08G 63/16 524/47 |

FOREIGN PATENT DOCUMENTS

| KR | 10-1999-0009593 | 5/1999 |
| KR | 10-0305712 | 8/2001 |
| KR | 10-0366484 | 12/2002 |
| WO | WO 2009127556 A1 * | 10/2009 ............. C08G 63/16 |
| WO | WO 2012/165734 | 12/2012 |

OTHER PUBLICATIONS

International Preliminary Report on Patentability dated Dec. 4, 2013 From the Korean Intellectual Property Office Re. Application No. PCT/KR2011/009124 and Its Translation Into English.

* cited by examiner

*Primary Examiner* — Jane L Stanley
(74) *Attorney, Agent, or Firm* — Maschoff Brennan

(57) ABSTRACT

The present invention relates to an aliphatic-aromatic copolyester resin composition with excellent hydrolysis resistance, wherein an unsaturated compound or an anhydride thereof is introduced into a molecular structure, and specifically, the aliphatic-aromatic copolyester resin composition can be manufactured into all molded products by extrusion, injection and the like, by solving problems with respect to physical properties, processability, reaction rates and water solubility of conventional biological resins.

26 Claims, No Drawings

HYDROLYSIS RESISTANT AND BIODEGRADABLE ALIPHATIC-AROMATIC COPOLYESTER RESIN COMPOSITION

RELATED APPLICATIONS

This application is a National Phase of PCT Patent Application No. PCT/KR2011/009124 having International filing date of Nov. 28, 2011, which claims the benefit of priority of Korean Patent Application No. 10-2011-0054171 filed on Jun. 3, 2011. The contents of the above applications are all incorporated by reference as if fully set forth herein in their entirety.

FIELD OF THE INVENTION

This invention relates to an aliphatic/aromatic copolyester resin composition with good hydrolysis resistance, which is produced by incorporating an unsaturated compound and its anhydride into the molecular structure of the aliphatic/aromatic copolyester and thus resolving the problems in preparing an biodegradable resin according to the prior art caused by slow reaction time, poor mechanical property, and weak hydrolysis resistance. The aliphatic/aromatic copolyester thus obtained has a number-average molecular weight of from 30,000 to 60,000 and the weight-average molecular weight of from 50,000 to 300,000, and a melting point of from 50 to 150° C.

BACKGROUND

A method for preparing aliphatic/aromatic copolyester resins and composition containing the same are known in the art and the aliphatic/aromatic copolyester resins have been studied for their extended application and their processabilities and mechanical and physical properties for several decades.

For example, U.S. Pat. No. 4,094,721 (Jun. 13, 1978) and U.S. Pat. No. 4,966,959 (Oct. 30, 1996) disclose an aliphatic/aromatic copolyester resin composition and its melting point and the other properties wherein said copolyester resin composition has 40 mole % of aromatic acid moieties and the remaining aliphatic acid moieties in the molecular structure of copolyester and a total sum of said acid moieties is 100 mole % and wherein said copolyester is produced by reacting the acid moieties with a mixture of 1,4-butanediol and the others as a glycol moiety.

The above prior patents particularly disclose the range of composition of aliphatic acid components and aromatic acid components, etc. which can produce biodegradable aliphatic/aromatic copolyester in the aliphatic/aromatic copolyester resin composition and disclose in detail the melting point, inherent viscosity, etc. and some general features of said aliphatic/aromatic copolyester depending on composition of the components used.

All plastics can be used as an adhesive, if required, by using the property of plastics that allows them to be cured on cooling after melting. The above aliphatic/aromatic copolyester can be also used as a hot-melt adhesive (see, U.S. Pat. No. 4,401,805 issued on Aug. 30, 1983 and U.S. Pat. No. 4,328,059 issued on May 4, 1982). The aliphatic/aromatic copolyester exhibits tackness depending on the kind and the number of the used components. According to U.S. Pat. No. 4,966,959 (1990, Cox. A. Heyer. M. F.), the glycol components to be used must two dialcohol components in order to make an aliphatic/aromatic copolyester with tackiness.

The publication of Korean patent application no. 10-1993-0701622 discloses that although the tackness of aliphatic/aromatic copolyester according to the above prior art results in a problem in forming a plastic article, the above problem was overcome by using a single component other than a mixture of at least two components as a glycol component used in preparing aliphatic/aromatic copolyester.

However, it is well known by a person skilled in the art that it is possible to remove the tackness by adjusting the number and the kind of the components used in preparing the aliphatic/aromatic copolyester. U.S. Pat. No. 4,328,059 discloses a method for preparing aliphatic/aromatic copolyester by solely using dialcohol. In addition to the above patent literatures, Journal of Macromolecule, SCI-Chem A-23(3), 1986, P393-409 discloses that aliphatic/aromatic copolyester composition has biodegradable property when aliphatic acid component at least a portion of aliphatic acid components exists. However, aliphatic/aromatic copolyester produced by the method as stated above still has inferior processibility and mechanical property, etc. to commonly-used resins such as polyethylene, polypropylene, polystyrene and the like. Accordingly, in order to resolve the problem in connection with the aliphatic/aromatic copolyester, extensive studies have been performed.

For example, the publication of Korean patent application no. 10-1999-7002353 discloses a method of preparing aliphatic/aromatic copolyester by oligomerising chain extender such as diisocyanate or hexamethylenediisocyanate to control the content of NCO, i.e. functional group for chain extension and using the oligomerized chain extender. This method uses multifunctional group and isocyanate in order to insure processibility and mechanical property by making the resulting copolyester to have high molecular weight. However, due to the isocyanate, stability of the manufacturer can be affected in preparing copolyester and it is detrimental to the environment and human body. In addition, the above method has disadvantage in view of economy.

The publication of Korean patent application no. 10-1997-2703252 discloses a method of preparing aliphatic/aromatic copolyester resin by using a sulfonate compound or a compound having at least three functional groups which can result in ester. However, this method makes the reaction time short and makes the average molecular weight high, but molecular weight distribution of the aliphatic/aromatic copolyester composition is broad and a large amount of low molecular weight copolyester are resulted. The aliphatic/aromatic copolyester resin produced by the above method is pyrodegradable and an article prepared by the above copolyester resin has weak moisture resistance to the moisture in the atmosphere, thereby lowering durability of the article.

The invention of Korean patent application no. 10-1997-0703253 uses dihydroxy compound containing ether functional group to prepare aliphatic/aromatic copolyester resin. This invention used polyol represented by polyethyleneglycol in the example. In this case, esterification and polycondensation reactions is not easily performed and thus not only it is difficult to obtain aliphatic/aromatic copolyester with high molecular weight but also the reaction time increases and it is disadvantage in view of preparing cost.

SUMMARY OF INVENTION

Technical Problem

Thus, the inventors of the present invention have resolved the above issues by incorporating a double bond into the molecular structure of the aliphatic/aromatic copolyester resin composition and achieved the present invention by optimizing the ratio of composition of the components suitable for preparing the present composition and the reaction condition.

Solution to Problem

The aliphatic/aromatic copolyester resin composition of the invention is produced by using aromatic dicarboxylic acid, aliphatic dicarboxylic acid (including cyclic aliphatic), aliphatic (including cyclic aliphatic) glycol, unsaturated aliphatic carboxylic acid or its anhydride, and unsaturated aliphatic glycol compounds as major components.

Effect of Invention

According to the invention, all molded articles such as injection or extrusion molded articles can be produced by providing an aliphatic/aromatic copolyester resin with good hydrolysis resistance, which includes unsaturated compound or its anhydride incorporated in the molecular structure thereof, while resolving the problems in connection with physical property, processibility, reaction speed and poor moisture resistance.

DETAILED DESCRIPTION

The present invention provides an aliphatic/aromatic copolyester essentially comprising an unsaturated aliphatic (including cyclic aliphatic) carboxylic acid of formula 1 or its anhydride and an unsaturated aliphatic(including cyclic aliphatic) glycol of formula 2:

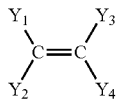 [formula (1)]

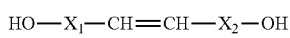 [formula (2)]

wherein $Y_1$, $Y_2$, $Y_3$, and $Y_4$ are independently hydrogen; alkyl group containing from 1 to 20 carbon atoms (i.e. $C_{1-20}$ alkyl group); or hydrocarbon group containing from 1 to 20 carbon atoms and carboxyl group as a functional group, provided that at least two of $Y_1$, $Y_2$, $Y_3$, and $Y_4$ are hydrocarbon group containing from 1 to 20 carbon atoms and carboxyl group as a functional group, and $X_1$ and $X_2$ are independently alkyl group containing from 1 to 20 carbon atoms.

The aliphatic/aromatic copolyester resin composition of the present invention comprises the following components along with the unsaturated aliphatic(including cyclic aliphatic) carboxylic acid of formula 1 or its anhydride and the unsaturated aliphatic(including cyclic aliphatic) glycol of formula 2:
i) Acid component mixture of 30 mole % to 70 mole % of aliphatic dicarboxylic acid and 30 mole % to 70 mole % of aromatic dicarboxylic acid and 0 mole % to 2 mole % of carboxylic acid having at least three functional group, which is acid component represented hereafter by component A,
ii) A mixture of 98 mole % to 100 mole % of alkanediol, cyclodiol or a mixture thereof and 0 mole % to 2 mole % of aliphatic glycol having at least three functional group based on a total of component A of aliphatic dicarboxylic acid and aromatic dicarboxylic acid, which is glycol component represented hereafter by component B,
iii) 0 to 10 parts by weight of oxazoline relative to a total of 100 parts by weight of acid component mixture of components A and B and aliphatic glycol, which is represented hereafter by component C, and
iv) 0 to 10 parts by weight of carbodiimide relative to a total of 100 parts by weight of acid component mixture of components A and B and aliphatic glycol, which is represented hereafter by component D.

The aliphatic/aromatic copolyester resin composition with hydrolysis resistance produced by the invention is prepared by adding 0.001 to 10 parts by weight of unsaturated compounds or their anhydrides represented by formula 1 and formula 2 or their mixture relative to a total of 100 parts by weight of the acid component mixture and the aliphatic glycol to a mixture of components A, B, C and D, components A, B and C, components A, B and D, or components A and B, or a mixture of the above four components and isocyanate immediately before or after esterfication, transesterfication or polycondensation. The aliphatic/aromatic copolyester thus obtained has a number-average molecular weight of from 30,000 to 60,000 and the weight-average molecular weight of from 50,000 to 300,000, and a melting point of from 80 to 150° C.

The aliphatic dicarboxylic acid suitable for the acid component as represented herein by component A is a compound of formula 3 as stated below:

 [formula (3)]

wherein n is integer of 2 to 10, and R is hydrogen or methyl group.

An example of aliphatic dicarboxylic acid suitable for the acid component as represented herein by component A is succinic acid, glutaric acid, adipic acid, pimelic acid, azelaic acid, sebacic acid, 1,4-cyclohexanedicarboxylic acid. The above components can be used solely or in combinations of two or more.

The aromatic dicarboxylic acid suitable for the acid component as represented herein by component A is terephthalic acid, isophthalic acid, 2,6-naphthoic acid or their ester forming derivatives. In particular, terephthalic acid (or its ester forming derivative) is most useful. The above acid components can be used solely or in combinations of two or more.

The ratio of aliphatic dicarboxylic acid to aromatic dicarboxylic acid suitable for the acid component as represented herein by component A is from 70 mole %:30 mole % to 30 mole %:70 mole %, in preferably from 60 mole %:40 mole % to 40 mole %:60 mole %.

If aliphatic dicarboxylic acid is less than 30 mole % or aromatic dicarboxylic acid is more than 70 mole % relative to all the components of dicarboxylic acid, the resulted resin composition does not exhibit biodegradable property. In addition, if aliphatic dicarboxylic acid is more than 70 mole % or aromatic dicarboxylic acid is less than 30 mole %, the resulted resin composition has the disadvantage that the melting point is reduced and thus molding processibility is lowered.

The glycol component as represented herein by component B is linear alkanediol containing from 2 to 12 carbon atoms or cycloalkanediol containing from 5 to 10 carbon atoms.

The alkanediol used is ethyleneglycol, 1,2-propanediol, 1,2-butanediol, 1,4-butanediol, 1,6-hexanediol, 1,2-cyclohexanedimethanediol, in particularly 1,4-butanediol, and the above alkanediol components can be used solely or in combinations of two or more. It is preferable to use the diol component in excess amount by from 1.1 to 1.5 moles relative to one mole of dicarboxylic acid component as represented by component A. If the mole ratio of the diol component is less than 1.1 moles, the esterification or transesterification reaction is performed insufficiently and thus the color of the resulted resin is affected. If the mole ratio of the diol component is more than 1.5 moles, economical efficiency is reduced due to reduction in degree of vacuum in the process and increase in preparing cost.

The compound containing at least three functional group suitable for the acid component as represented by component A is malic acid, citric acid, trimesic acid, or tartaric acid and this acid component can be used solely or in combinations of two or more. The above acid component can be used in an amount of from 0 to 2 mole % based on 100 mole % of component A.

The compound containing at least three functional group suitable for use in combination with glycol as represented by component B is glycerol or pentaerytritol and this component is can be used solely or in combinations of two or more. This component can be used in an amount of from 0 to 2 mole % based on 100 mole % of component B. If the amount is more than 2 mole %, cross-linkage is formed in the molecular structure of the obtained resin and thus it is difficult to process the resin and release from the mold and a number of lower molecular weight resins are resulted and mechanical and physical properties are reduced.

The oxazoline as represented by component C is represented by a compound of formula 4 below:

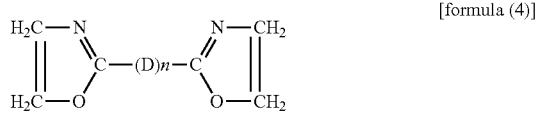

[formula (4)]

wherein D is linear or branched alkylene group containing from 1 to 6 carbon atoms, and n is 0 to 10.

An example of oxazoline is 2,2-bis-(2-oxazoline), N,N'-hexamethylene-bis-(2-carbamoyl-2-oxazoline), 2,2'-methylene-bis-(2-oxazoline), 2,2'-ethylene-bis-(2-oxazoline), 2,2'-propylene-bis-(2-oxazoline), 1,3-phenylene-bis-(2-oxazoline), and 2,2-P-phenylene-bis-(2-oxazoline), the amount used is from 0 to 10 parts by weight relative to a total of 100 parts by weight of the acid component mixture of component A and B and the aliphatic glycol component.

The compound of formula 5 below is a representatives of carbodiimide compound as represented herein by component D:

[formula (5)]

wherein $R_1$ and $R_2$ is the same or different from each other and is alkyl group containing 4 to 20 carbon atoms or cycloalkyl group containing 4 to 20 carbon atoms.

An example of component D is 1,3-dicyclohexylcarbodiimide, HMV-8CA and HMV-10B sold by N is shinbo in Japan, bis-(2,6-diisopropyl-phenylene-2,4-carbodiimide), poly-(1,3,5-triisopropyl-phenylene-2,4-carbodiimide) and the like.

According to the invention, isocyanate as chain extender may be used in an amount of 0 to 5 parts by weight relative to a total of 100 parts by weight of the acid component mixture and the aliphatic glycol. For example, there are 1,6-hexamethylenediisocyanate, isophoronediisocyanate, 4,4'-diphenylmethanediisocyanate, 2,2'-diphenylmethanediisocyanate and the like as chain extender, and particularly 1,6-hexamethylenediisocyanate is most useful. It is preferable to add the chain extender in an amount of 0.01 to 5 parts by weight relative to a total of 100 parts by weight of the acid component mixture and the aliphatic glycol. If the chain extender is used in an amount of more than 5 parts by weight, gelling in the composition can take place.

The unsaturated aliphatic carboxylic acid or its anhydride (formula 1) used in the invention is selected from the group consisting of fumaric acid, maleic acid, 1-hexene-1,6-dicarboxylic acid, 2,5-dimethyl-3-hexene-1,6-dicarboxylic acid, 3-heptene-1,7-dicarboxylic acid, allylmalonic acid, itaconic acid and their anhydrous derivatives and a mixture of at least two of them. Preferably, the anhydrides of unsaturated aliphatic carboxylic acid is selected from the group consisting of anhydrous maleic acid, anhydrous succinic acid, anhydrous itaconic acid and a mixture of at least two of them. The unsaturated aliphatic carboxylic acid or its anhydride may be used in an amount of 0.01 to 10 parts by weight relative to a total of 100 parts by weight of the acid component mixture and the aliphatic glycol. If the unsaturated aliphatic carboxylic acid or its anhydride is used in an amount of less than 0.01 parts by weight, reaction speed is reduced. If the unsaturated aliphatic carboxylic acid or its anhydride is used in an amount of more than 5 parts by weight, gelling in the composition can take place.

Preferably the unsaturated aliphatic glycol (formula 2) is selected from the group consisting of 2-butene-1,4-diol, 2-hexene-1,5-diol, 3-hexene-1,6-diol, 2-hexene-1,6-diol, 2-butene-1,4-dimethyl-1,4-diol and a mixture of at least two of them.

The aliphatic/aromatic copolyester resin composition according to the invention is described in more detail by classifying seven types as follows.

(1) A liphatic/aromatic copolyester resin composition containing aliphatic (including cyclic aliphatic) dicarboxylic acid, aromatic dicarboxylic acid (or its derivative), and aliphatic (including cyclic aliphatic) glycol as a main component and additionally containing unsaturated aliphatic (including cyclic aliphatic) compound or its anhydride is as follows.

Firstly, aliphatic dicarboxylic acid is succinic acid, glutaric acid, adipic acid, pimelic acid, azelaic acid, sebacic acid, 1,4-cyclohexanedicarboxylic acid. This component is used solely or as a mixture thereof. The ratio of liphatic dicarboxylic acid to aromatic dicarboxylic acid used in preparation of aliphatic/aromatic copolyester resin composition of the invention is from 70 mole %:30 mole % to 30 mole %:70 mole %, preferably from 60 mole %:40 mole % to 40 mole %:60 mole %.

If the amount of aliphatic dicarboxylic acid is less than 30 mole % relative to a total of dicarboxylic acid and the amount of aromatic dicarboxylic acid is more than 70 mole %, the obtained resin composition does not exhibit biodegradability. If the amount of aliphatic dicarboxylic acid is more than 70 mole % and the amount of aromatic dicarboxylic acid is less than 30 mole %, the obtained resin composition has a low melting point and thus molding processibility is lowered.

The aromatic dicarboxylic acid used in the method of the present invention is terephthalic acid, isophthalic acid, 2,6-naphthoic acid or their ester forming derivatives. Particularly, terephthalic acid (or its ester forming derivative) is most useful. The above components are used solely or as a mixture thereof.

The glycol component which is component B is 1,4-butanediol, ethylene glycol, 1,6-hexanediol and the like, and preferably 1,4-butanediol, and the above components are used solely or as a mixture thereof. In case of the mixture, the weight ratio of 1,4-butanediol to ethylene glycol is from 100:0 to 80:20. If the content of ethylene glycol is no less than 20% by weight, a problem on moldability can be arised by a low melting point of the resin composition.

The unsaturated compounds or their anhydrides represented by formula 1 and formula 2 or their mixture is added in the amount of 0.001 to 10 parts by weight relative to a total of 100 parts by weight of the acid component mixture of components A and B and the aliphatic glycol. If the amount is less than 0.001 parts by weight, it is not expected to result in any effects. If the amount is more than 10 parts by weight, gelling of the resin composition may occur. In this case, the weight ratio of unsaturated aliphatic carboxylic acid compound or its anhydride to unsaturated aliphatic glycol compound may be from 10:0 to 0:10. The resin obtained is aliphatic/aromatic copolyester with good hydrolysis resistance. In this case, the unsaturated aliphatic carboxylic acid used is selected from the group consisting of fumaric acid, maleic acid, 1-hexene-1,6-dicarboxylic acid, 2,5-dimethyl-3-hexene-1,6-dicarboxylic acid, 3-heptene-1,7-dicarboxylic acid, allylmalonic acid, itaconic acid and their anhydrous derivatives and a mixture of at least two of them. The anhydride of unsaturated aliphatic carboxylic acid is selected from the group consisting of anhydrous maleic acid, anhydrous succinic acid, anhydrous itaconic acid and a mixture of at least two of them.

In this case, the unsaturated aliphatic glycol is preferably selected from the group consisting of 2-butene-1,4-diol, 2-hexene-1,5-diol, 3-hexene-1,6-diol, 2-hexene-1,6-diol, 2-butene-1,4-dimethyl-1,4-diol and a mixture of at least two of them.

(2) The compound having at least three functional group among acid component mixture represented by component A in the aliphatic/aromatic copolyester resin composition as described in item (1) is malic acid, citric acid, trimesic acid and tartaric acid, and they are used solely or as a mixture thereof. The used amount of such compound is 0 to 2 mole % based on 100 mole % of component A.

The compound having at least three functional group which can be used in combination with glycol represented by component B is glycerol and pentaerytritol, and they are used solely or as a mixture thereof. The used amount of such compound is 0 to 2 mole % based on 100 mole % of component B. If the used amount is more than 2 mole %, the resin obtained has cross-linkage in its molecular structure and thus it is difficult to process the resin and release from the mold, and low molecular weight resins are largely produced thereby lowering mechanical and physical property.

(3) This case is a case of the resin composition in which oxazoline compound is added to aliphatic/aromatic copolyester resin composition as described in item (2). In this case, an example of oxazoline compound is 2,2-bis-(2-oxazoline), N,N'-hexamethylene-bis-(2-carbamoyl-2-oxazoline), 2,2'-methylene-bis-(2-oxazoline), 2,2'-ethylene-bis-(2-oxazoline), 2,2'-propylene-bis-(2-oxazoline), 1,3-phenylene-bis-(2-oxazoline), and 2,2-P-phenylene-bis-(2-oxazoline). The amount of oxazoline compound added is 0 to 10 parts by weight relative to a total of 100 parts by weight of the acid component mixture and the aliphatic glycol.

(4) This case is a case of the resin composition in which oxazoline compound is added to aliphatic/aromatic copolyester resin composition as described in item (1). In this case, the amount of oxazoline compound added is 0 to 10 parts by weight relative to a total of 100 parts by weight of the acid component mixture and the aliphatic glycol, and an example of oxazoline compound is 2,2-bis-(2-oxazoline), N,N'-hexamethylene-bis-(2-carbamoyl-2-oxazoline), 2,2'-methylene-bis-(2-oxazoline), 2,2'-ethylene-bis-(2-oxazoline), 2,2'-propylene-bis-(2-oxazoline), 1,3-phenylene-bis-(2-oxazoline), 2,2-P-phenylene-bis-(2-oxazoline).

(5) This case is a case of the resin composition in which carbodiimide compound is added to aliphatic/aromatic copolyester resin composition as described in item (1). In this case, 1,3-dicyclohexylcarbodiimide, HMV-8CA and HMV-10B sold by Nisshinbo in Japan, bis-(2,6-diisopropyl-phenylene-2,4-carbodiimide), or poly-(1,3,5-triisopropyl-phenylene-2,4-carbodiimide) as carbodiimide compound are preferably used. The amount of carbodiimide compound added is 0 to 10 parts by weight relative to a total of 100 parts by weight of the acid component mixture and the aliphatic glycol.

(6) This case is a case of the resin composition in which oxazoline compound and carbodiimide compound are added to the aliphatic/aromatic copolyester resin composition as described in item (1). In this case, the kind and the amount of multifunctional compound are the same as those of the resin composition as described in item (2), the kind and the amount of oxazoline compound are the same as those of the resin composition as described in item (3), and the kind and the amount of carbodiimide compound are the same as those of the resin composition as described in item (5), (7) This case is a case of the resin composition in which isocyanate based compound as chain extender is added to the aliphatic/aromatic copolyester resin composition as described in any of items (1) to (6). In this case, the amount of isocyanate based compound added can be 0 to 5 parts by weight relative to a total of 100 parts by weight of the acid component mixture and the aliphatic glycol. 1,6-hexamethylenediisocyanate, isophoronediisocyanate, 4,4'-diphenylmethanediisocyanate, 2,2'-diphenylmethanediisocyanate and the like can be used, and particularly, 6-hexamethylenediisocyanate is most useful. It is preferable to add in an amount of 0.01 to 5 parts by weight.

The method for preparing the biodegradable aliphatic/aromatic copolyester resin composition according to the invention is now described in detail. The resin composition according to the invention comprises steps of mixing the acid component mixture of aliphatic (including cyclic aliphatic) dicarboxylic acid or its anhydride and aromatic dicarboxylic acid or its anhydride; aliphatic (including cyclic aliphatic) glycol; and unsaturated aliphatic (including cyclic aliphatic) carboxylic acid or its anhydride, unsaturated aliphatic (including cyclic aliphatic) glycol or their mixtures, esterifying or transesterifying the resulted mixture by adding 0.0001 to 1 parts by weight of catalyst and stabilizer respectively relative to a total of 100 parts by weight of the acid component mixture and the aliphatic glycol, and polycondensating the obtained reaction products by adding 0.3 to 1.5 parts by weight of polycondensation catalyst and 0.0001 to 0.5 parts by weight of stabilizer respectively relative to a total of 100 parts by weight of the acid component mixture and the aliphatic glycol.

In the esterifying or transesterifying step, the mole ratio of aliphatic (including cyclic aliphatic) dicarboxylic acid or its anhydride and aromatic dicarboxylic acid or its anhydride to aliphatic (including cyclic aliphatic) glycol is preferably from 1:1.1 to 1:1.5.

In this case, if the mole ratio of glycol to one mole of dicarboxylic acid is less than 1.1, color of the resin become poor and degree of polymerization is lowered. if the mole ratio of glycol is more than 1.5, the reactivity is improved, but this causes increase in preparing cost.

The esterifying or transesterifying step is performed suitably at the temperature of 170 to 230 C.

The compound having at least three functional groups among acid components represented by component A is malic acid, citric acid, trimesic acid, tartaric acid and a mixture of at least two of them. The compound having at least three functional groups is used in an amount of 0 to 2 mole % based on 100 mole % of component A.

The compound having at least three functional groups which can be combined with the glycol represented by component B is glycerol, pentaerytritol and a mixture of at least two of them. This component may be used in an amount of 0 to 2 mole % based on 100 mole % of component B. If the amount used is more than 2 mole %, it is difficult to process or withdraw the resin due to the cross-linkage in the molecular structure of the resin, and the physical property of the article resulted from the resin is reduced.

In the method according to the invention, oxazoline compound may be used for stability of the reaction. An example of oxazoline compound is 2,2-bis-(2-oxazoline), N,N'-hexamethylene-bis-(2-carbamoyl-2-oxazoline), 2,2'-methylene-bis-(2-oxazoline), 2,2'-ethylene-bis-(2-oxazoline), 2,2'-propylene-bis-(2-oxazoline), 1,3-phenylene-bis-(2-oxazoline), and 2,2-P-phenylene-bis-(2-oxazoline). The oxazoline compound is used in an amount of 0 to 10 parts by weight relative to a total of 100 parts by weight of the acid component and the aliphatic glycol.

In the method according to the invention, a carbodiimide compound may be used for improving hydrolysis resistance of aliphatic/aromatic copolyester. The carbodiimide compound is preferably 1,3-dicyclohexylcarbodiimide, HMV-8CA and HMV-10B sold by Nisshinbo in Japan, bis-(2,6-diisopropyl-phenylene-2,4-carbodiimide), poly-(1,3,5-triisopropyl-phenylene-2,4-carbodiimide). The carbodiimide compound is used in an amount of 0 to 10 parts by weight relative to a total of 100 parts by weight of the acid component and the aliphatic glycol.

In the method according to the invention, isocyanate may be used as a stabilizer in an amount of 0 to 5 parts by weight relative to a total of 100 parts by weight of the acid component and the aliphatic glycol.

An example of isocyanate is 1,6-hexamethylenediisocyanate, isophoronediisocyanate, 4,4'-diphenylmethanediisocyanate, and 2,2'-diphenylmethanediisocyanate. 1,6-Hexa methylenediisocyanate is particularly useful. Preferably, isocyanate is used in an amount of 0.01 to 5 parts by weight.

Catalyst and stabilizer can be added at the initial stage of esterification and transesterification. The catalyst used in the method of the invention is dibutyltinoxide, tetrabutyl titanate, or their mixture. The stabilizer is triphenyl phosphate, trimethyl phosphate or their mixture. The amounts of the catalyst and the stabilizer respectively are appropriately 0.0001 to 1 parts by weight relative to a total of 100 parts by weight of the acid component and the aliphatic glycol. If the amount of the catalyst is less than 0.0001 parts by weight, the reaction speed of transesterification is lowered.

If the amount of the catalyst is more than 1 parts by weight, the reaction speed of transesterification is increased but a problem on color is occurred. If the amount of the stabilizer is less than 0.0001 parts by weight, it is impossible to prevent hydrolysis of reaction products from transesterification. If the amount of the stabilizer is more than 1 parts by weight, the reaction speed of transesterification is lowered.

A catalyst for facilitating polycondensation can be added at the initial stage of polycondensation. An example of such catalyst is selected from the group consisting of magnesium acetate, tetrapropyl titanate, zinc acetate, tetrabutyl titanate, dibutyltinoxide, calcium acetate, tetraisopropyl titanate and a mixture of at least two of them. The amounts of such catalyst is appropriately 0.3 to 1.5 parts by weight relative to a total of 100 parts by weight of the acid component and the aliphatic glycol. If the amount is less than 0.3 parts by weight, increase in the molecular weight is limited after a period of time. If the amount is more than 1.5 parts by weight, the reaction speed of transesterification is increased but a problem on color is occurred.

Also, an stabilizer can be added at the polycondensation step. An example of such stabilizer is selected from the group consisting of trimethyl phosphate, trimethyl phosphine, triphenyl phosphate, phosphate and a mixture of at least two of them. The amounts of such stabilizer is appropriately 0.0001 to 0.5 parts by weight relative to a total of 100 parts by weight of the acid component and the aliphatic glycol. If the amount is less than 0.0001 parts by weight, Such stabilizer does not role as a stabilizer. If the amount is more than 0.5 parts by weight, the reaction is delayed to increase the reaction time.

The polycondensation is preferably performed at the temperature of 230 to 260° C. If the polycondensation temperature is less than 230° C, reaction time is increased. If the polycondensation temperature is more than 260° C, thermal degradation is occurred. The period of polycondensation is varied depending on the amounts of the catalyst and the stabilizer, but the period of polycondensation is preferably 50 to 250 minutes.

The aliphatic/aromatic copolyester resin prepared by the method of the invention has biodegradability as well as has similar or better physical property to commonly-used polyethylene.

Preferably, the invention provides an aliphatic/aromatic copolyester resin composition with hydrolysis resistance and biodegradable property, which is produced by mixing an acid component mixture composed of 30 mole % to 70 mole % of aliphatic dicarboxylic acid or its anhydride and 30 mole % to 70 mole % of aromatic dicarboxylic acid or its anhydride; 1.1 to 1.5 mole ratio of aliphatic glycol to one mole of the acid component mixture; and 0.001 to 10 parts by weight of unsaturated aliphatic carboxylic acid or its anhydride of the following formula 1, unsaturated aliphatic glycol of the following formula 2, or their mixture relative to a total of 100 parts by weight of the acid component mixture and the aliphatic glycol, esterifying or transesterifying the resulted mixture by adding 0.0001 to 1 parts by weight of catalyst and stabilizer relative to a total of 100 parts by weight of the acid component mixture and the aliphatic glycol and polycondensating the obtained reaction products by adding 0.3 to 1.5 parts by weight of polycondensation catalyst and 0.0001 to 0.5 parts by weight of stabilizer respectively relative to a total of 100 parts by weight of the acid component mixture and the aliphatic glycol:

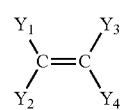

[formula (1)]

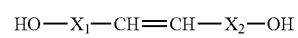

[formula (2)]

wherein $Y_1$, $Y_2$, $Y_3$, and $Y_4$ are independently hydrogen; alkyl group containing from 1 to 20 carbon atoms (i.e. $C_{1-20}$ alkyl group); or hydrocarbon group containing from 1 to 20 carbon atoms and carboxyl group as a functional group, provided that at least two of $Y_1$, $Y_2$, $Y_3$, and $Y_4$ are hydrocarbon group containing from 1 to 20 carbon atoms and carboxyl group as a functional group, and $X_1$ and $X_2$ are independently alkyl group containing from 1 to 20 carbon atoms.

Also, the invention provides an injection or extrusion molded article resulted from the above aliphatic/aromatic copolyester resin composition.

Also, the invention provides a compounded composition prepared by adding starch, calcium carbonate or talc to the above aliphatic/aromatic copolyester resin composition, or a molded article thereof.

The invention is described in detail by way of examples.

EXAMPLE 1

A 500 ml round-bottom flask was purged with nitrogen. 93.2 g of dimethyl terephthalate, 121.6 g of 1,4-butanediol and 0.1 g of 2-butene-1,4-diol were added to the purged flask, and then 0.1 g of tetramethyltitanate was added. The mixture obtained was allowed to esterify at 200° C. for two hours and then a theoretical amount of methanol was removed. Subsequently, to the resulted product, 0.25 g of fumaric acid and 76 g of adipic acid were added and then the reaction temperature was maintained at 200° C. and water was removed. At this time, 0.1 g of antimony acetate, 0.1 g of t-butyltin oxide, and 0.1 g of tetrabutyl titanate as stabilizers and 0.2 g of trimethylphosphate were added. Subsequently, a theoretical amount of methanol was removed and then the product obtained was heated to increase the temperature and polycondensed at 255° C. under the reduced pressure of no more than 2.00 Torr for 150 minutes. The resin thus obtained has the number-average molecular weight of 32,500 and the weight-average molecular weight of 72,000, and the melting point of 123° C. as measured by DSC method.

EXAMPLE 2

A 500 ml round-bottom flask was purged with nitrogen. 93.2 g of dimethyl terephthalate, 121.6 g of 1,4-butanediol, 0.15 g of 2-butene-1,4-diol and 1.25 g of malic acid were added to the purged flask, and then 0.1 g of tetramethyltitanate was added. The mixture obtained was allowed to esterify at 200° C. for two hours and then a theoretical amount of methanol was removed. Subsequently, to the resulted product, 0.1 g of fumaric acid and 76 g of adipic acid were added and then the reaction temperature was maintained at 200° C. and water was removed. At this time, 0.1 g of antimony acetate, 0.1 g of t-butyltin oxide, and 0.1 g of tetrabutyl titanate as catalysts and 0.2 g of trimethylphosphate as stabilizers were added. Subsequently, a theoretical amount of methanol was removed, the product obtained was heated to increase the temperature and polycondensed at 255° C. under the reduced pressure of no more than 2.00 Torr for 150 minutes and then 0.3 g of 2,2-bis-(2-oxazoline) was added. The mixture obtained was allowed to react for 10 minutes to yield a product. The resin thus obtained has the number-average molecular weight of 38,200 and the weight-average molecular weight of 80,300, and the melting point of 123.5° C. as measured by DSC method.

EXAMPLE 3

A 500 ml round-bottom flask was purged with nitrogen. 93.2 g of dimethyl terephthalate, 121.6 g of 1,4-butanediol, and 0.27 g of citric acid were added to the purged flask, and then 0.1 g of tetramethyltitanate was added. The mixture obtained was allowed to esterify at 200° C. for two hours and then a theoretical amount of methanol was removed. Subsequently, to the resulted product, 0.65 g of fumaric acid and 76 g of adipic acid were added and then the reaction temperature was maintained at 200° C. and water was removed. At this time, 0.1 g of antimony acetate, 0.1 g of t-butyltin oxide, and 0.1 g of tetrabutyl titanate as catalysts and 0.2 g of trimethylphosphate as stabilizers were added. Subsequently, a theoretical amount of methanol was removed, the product obtained was heated to increase the temperature and polycondensed at 250° C. under the reduced pressure of no more than 2.00 Torr for 100 minutes and then 0.4 g of HMV 8CA sold by Nisshinbo in Japan was added. The mixture obtained was allowed to react for 10 minutes to yield a product. The resin thus obtained has the number-average molecular weight of 42,300 and the weight-average molecular weight of 103,100, and the melting point of 125.2° C. as measured by DSC method.

EXAMPLE 4

A 500 ml round-bottom flask was purged with nitrogen. 93.2 g of dimethyl terephthalate, 121.6 g of 1,4-butanediol, and 0.2 g of 2-butene-1,4-diol were added to the purged flask, and then 0.1 g of tetramethyltitanate was added. The mixture obtained was allowed to esterify at 200° C. for two hours and then a theoretical amount of methanol was removed. Subsequently, to the resulted product, 76 g of adipic acid were added and then the reaction temperature was maintained at 200° C. and water was removed. At this time, 0.1 g of antimony acetate, 0.1 g of t-butyltin oxide, and 0.1 g of tetrabutyl titanate as catalysts and 0.2 g of trimethylphosphate as stabilizers were added. Subsequently, a theoretical amount of methanol was removed, the product obtained was heated to increase the temperature and polycondensed at 250° C. under the reduced pressure of no more than 2.00 Torr for 220 minutes. The resin thus obtained has the number-average molecular weight of 33,200 and the weight-average molecular weight of 68,200, and the melting point of 123.2° C. as measured by DSC method.

EXAMPLE 5

A 500 ml round-bottom flask was purged with nitrogen. 93.2 g of dimethyl terephthalate, 121.6 g of 1,4-butanediol, and 0.18 g of 2-butene-1,4-diol were added to the purged flask, and then 0.1 g of tetramethyltitanate was added. The mixture obtained was allowed to esterify at 200° C. for two hours and then a theoretical amount of methanol was removed. Subsequently, to the resulted product, 0.5 g of malic acid and 76 g of adipic acid were added and then the reaction temperature was maintained at 200° C. and water was removed. At this time, 0.1 g of antimony acetate, 0.1 g of t-butyltin oxide, and 0.1 g of tetrabutyl titanate as catalysts and 0.2 g of trimethylphosphate as stabilizers were added. Subsequently, a theoretical amount of methanol was removed, the product obtained was heated to increase the temperature and polycondensed at 255° C. under the reduced pressure of no more than 2.00 Torr for 180 minutes. The resin thus obtained has the number-average molecular weight of 31,200 and the weight-average molecular weight of 64,300, and the melting point of 123.8° C. as measured by DSC method.

EXAMPLE 6

A 500 ml round-bottom flask was purged with nitrogen. 93.2 g of dimethyl terephthalate, 121.6 g of 1,4-butanediol, and 0.1 g of tetramethyltitanate were added to the purged flask. The mixture obtained was allowed to esterify at 200° C. for two hours and then a theoretical amount of methanol was removed. Subsequently, to the resulted product, 0.3 g of fumaric acid and 76 g of adipic acid were added and then the reaction temperature was maintained at 200° C. and water was removed. At this time, 0.1 g of antimony acetate, 0.1 g of t-butyltin oxide, and 0.1 g of tetrabutyl titanate as catalysts and 0.2 g of trimethylphosphate as stabilizers were added. Subsequently, a theoretical amount of methanol was removed, the product obtained was heated to increase the temperature and polycondensed at 255° C. under the reduced pressure of no more than 2.00 Torr for 130 minutes and 0.1 g of 1,6-hexamethylenediisocyanate was added and after 140 minutes the reaction was terminated. The resin thus obtained has the number-average molecular weight of 40,220 and the weight-average molecular weight of 98,730, and the melting point of 125.1° C. as measured by DSC method.

EXAMPLE 7

A 500 ml round-bottom flask was purged with nitrogen. 93.2 g of dimethyl terephthalate, 121.6 g of 1,4-butanediol, and 0.3 g of malic acid were added to the purged flask, and then 0.1 g of tetramethyltitanate was added. The mixture obtained was allowed to esterify at 200° C. for two hours and then a theoretical amount of methanol was removed. Subsequently, to the resulted product, 0.3 g of fumaric acid, 0.3 g of malic acid and 76 g of adipic acid were added and then the reaction temperature was maintained at 200° C. and water was removed. At this time, 0.1 g of antimony acetate, 0.1 g of t-butyltin oxide, and 0.1 g of tetrabutyl titanate as catalysts and 0.2 g of trimethylphosphate as stabilizers were added. Subsequently, a theoretical amount of methanol was removed, the product obtained was heated to increase the temperature and polycondensed at 245° C. under the reduced pressure of no more than 2.0 Torr for 120 minutes and 0.1 g of HMV 8CA sold by Nisshinbo in Japan, 0.2 g of 2,2-bis-(2-oxazoline), and 0.1 g of 1,6-hexamethylenediisocyanate was added and after 10 minutes the reaction was terminated. The resin thus obtained has the number-average molecular weight of 39,400 and the weight-average molecular weight of 96,340, and the melting point of 124.8° C. as measured by DSC method.

COMPARATIVE EXAMPLE 1

A 500 ml round-bottom flask was purged with nitrogen. 93.2 g of dimethyl terephthalate and 121.6 g of 1,4-butanediol were added to the purged flask, and then 0.1 g of tetramethyltitanate was added. The mixture obtained was allowed to esterify at 200° C. for two hours and then a theoretical amount of methanol was removed. Subsequently, to the resulted product, 76 g of adipic acid were added and then the reaction temperature was maintained at 200° C. and water was removed. At this time, 0.1 g of antimony acetate, 0.1 g of t-butyltin oxide, and 0.1 g of tetrabutyl titanate as catalysts and 0.2 g of trimethylphosphate as stabilizers were added. Subsequently, a theoretical amount of methanol was removed, the product obtained was heated to increase the temperature and polycondensed at 255° C. under the reduced pressure of no more than 2.0 Torr for 320 minutes. The resin thus obtained has the number-average molecular weight of 23,000 and the weight-average molecular weight of 51,000, and the melting point of 125° C. as measured by DSC method.

COMPARATIVE EXAMPLE 2

A 500 ml Erlenmeyer flask was purged with nitrogen. To the purged flask, 23.6 g of succinic acid and 27 g of 1,4-butanediol, 0.1 g of tetrabutyl titanate as catalyst were added. The mixture obtained was allowed to esterify while increasing the temperature under nitrogen atmosphere and then water was removed. At this time, the temperature was hold at 205° C, and a theoretical amount of water was removed to yield 34.4 g of "low molecular weight aliphatic polymer body" and then to the Erlenmeyer flask, 77.7 g of dimethylterephthalate, 135.2 g of 1,4-butanediol, and 0.2 g of tetrabutyl titanate as a catalyst were added, the temperature was allowed to rise and then methanol was removed after transesterification. At this time, methanol was completely removed while maintaining the temperature at 205° C. Subsequently, to the Erlenmeyer flask, 35.4 g of succinic acid and 43.8 g of adipic acid were added and the esterification was performed. At this time, the temperature was hold at 180° C and water was completely removed, and thereafter 0.1 g of antimony trioxide, 0.1 g of t-butyltin oxide, and 0.7 g of tetrabutyl titanate as catalysts and 0.1 g of trimethylphosphate as stabilizer were added. Subsequently, the product obtained was heated to increase the temperature and polycondensed at 245° C under the reduced pressure of 0.3 Torr for 180 minutes. The resin thus obtained has the number-average molecular weight of 48,000 and the weight-average molecular weight of 310,000, and the melting point of 80° C as measured by DSC method. The degradable property test indicated that the resin exhibited good biodegradability as determined by the weight loss of 21% after 1 month, 53% after 2 months, and 91% after 3 months.

COMPARATIVE EXAMPLE 3

A 500 ml Erlenmeyer flask was purged with nitrogen. To the purged flask, 116.8 g of 1,4-butanediol, 35 g of adipic acid and 0.25 g of tindioctoate were added, and reacted at the temperature of 230 to 240° C. and a theoretical amount of water was completely removed. 82.6 g of the polymer thus obtained was taken up, thereafter, 65.5 g of dimethylterephthalate and 85 g of 1,4-butanediol were added and then the resulting methanol was removed while slowly stirring and heating to 180° C. At this time, 0.235 g of tetrabutylorthotitanate, 0.0825 g of pyromellitic dianhydride and 0.095 g of 50% phosphoric acid aqueous solution were added. Subsequently, the resulting product was polycondensed at from 230 to 240° C. under the reduced pressure of less than 1 Torr for 1200 minutes and the melting product was allowed to cool to 200° C., 1.45 g of hexamethylene diisocyanate was added over 15 minutes and then the resulting mixture was stirred. The resin thus obtained has the melting point of 108.3° C., number-average molecular weight of 17,589 and the weight-average molecular weight of 113,550.

The properties of the resins obtained by the above Examples and Comparative Examples are listed in Table 1.

TABLE 1

| | Number average molecular weight | Weight average molecular weight | Melting point (° C.) | Biodegradability (%) | Hydrolysis resistance |
|---|---|---|---|---|---|
| Example 1 | 52,500 | 72,000 | 123 | 93.1 | Good |
| Example 2 | 38,200 | 80,300 | 123.5 | 92.3 | Good |
| Example 3 | 42,300 | 103,100 | 125.2 | 91.0 | Good |
| Example 4 | 33,200 | 58,200 | 123.2 | 91.8 | Very good |
| Example 5 | 31,200 | 64,300 | 123.8 | 91.1 | Very good |
| Example 6 | 40,220 | 88,730 | 125.1 | 90.8 | Good |
| Example 7 | 39,400 | 96,340 | 124.8 | 90.2 | Very good |
| Comparative example 1 | 23,000 | 51,000 | 125 | 92 | Poor |
| Comparative example 2 | 48,000 | 310,000 | 80 | 91 | Normal |

TABLE 1-continued

|  | Number average molecular weight | Weight average molecular weight | Melting point (° C.) | Bio-degradability (%) | Hydrolysis resistance |
|---|---|---|---|---|---|
| Comparative example 3 | 17,589 | 113,550 | 108.9 | 28 | Normal |

The number average molecular weight and the weight average molecular weight were determined by chromatography on the basis of polystyrene, the melting point was determined by DSC method, and the biodegradability was examined by weight loss method on the article which was embedded in the ground at 30 cm depth and recovered after three months.

The hydrolysis resistance was determined on a film of 30 μm in thickness, which was obtained by pressing the resin resulted from the above Examples by the hotpress. the hydrolysis resistance was decided by comparing initial tensile strength on the film of 30 μm in thickness with tensile strength of the film which was maintained under 50% RH at 25° C. for three months. It was scored as very good for no less than 90% of remaining tensile strength, good for no less that 80% and less than 90% of remaining tensile strength, normal for no less that 70% and less than 80% of remaining tensile strength, and poor for less than 70% of remaining tensile strength.

The invention claimed is:

1. An aliphatic/aromatic copolyester resin composition with hydrolysis resistance and biodegradable property, which is produced by
    mixing an acid component mixture composed of 30 mole % to 70 mole % of aliphatic dicarboxylic acid or its anhydride and 30 mole % to 70 mole % of aromatic dicarboxylic acid or its anhydride; 1.1 to 1.5 mole ratio of aliphatic glycol to one mole of the acid component mixture; and 0.001 to 10 parts by weight of unsaturated aliphatic glycol, relative to a total of 100 parts by weight of the acid component mixture and the aliphatic glycol,
    esterifying or transesterifying the resulted mixture by adding 0.0001 to 1 parts by weight of catalyst and stabilizer respectively relative to a total of 100 parts by weight of the acid component mixture and the aliphatic glycol, and
    polycondensating the obtained reaction products by adding 0.3 to 1.5 parts by weight of polycondensation catalyst and 0.0001 to 0.5 parts by weight of stabilizer respectively relative to a total of 100 parts by weight of the acid component mixture and the aliphatic glycol,
    wherein the unsaturated aliphatic glycol is selected from the group consisting of 2-butene-1,4-diol, 2-hexene-1,5-diol, 3-hexene-1,6-diol, 2-hexene-1,6-diol, 2-butene-1,4-dimethyl-1,4-diol and a mixture of at least two of them, and
    wherein the aliphatic dicarboxylic acid is selected from the group consisting of succinic acid, glutaric acid, adipic acid and a mixture of at least two of them.

2. The aliphatic/aromatic copolyester resin composition according to claim 1, wherein the aromatic dicarboxylic acid is selected from the group consisting of terephthalic acid, isophthalic acid, 2,6-naphthoic acid and their ester forming derivatives, and a mixture of at least two of them.

3. The aliphatic/aromatic copolyester resin composition according to claim 1, wherein the aliphatic glycol is selected from the group consisting of ethyleneglycol, 1,2-propanediol, 1,2-butanediol, 1,4-butanediol, 1,6-hexanediol, 1,2-cyclohexanedimethanol and a mixture of at least two of them.

4. The aliphatic/aromatic copolyester resin composition according to claim 1, wherein, on esterification or transesterification, a multifunctional compound selected from the group consisting of malic acid, citric acid, trimesic acid, tartaric acid and a mixture of at least two of them is further added in amount of 2 mole % or less based on 100 mole % of the acid component mixture.

5. The aliphatic/aromatic copolyester resin composition according to claim 1, wherein, on esterification or transesterification, a multifunctional compound selected from the group consisting of glycerol, pentaerytritol and a mixture of at least two of them is further added in amount of 2 mole % or less based on 100 mole % of the glycol component.

6. The aliphatic/aromatic copolyester resin composition according to claim 1, wherein, on esterification or transesterification, an oxazoline compound selected from the group consisting of 2,2-bis-(2-oxazoline), N,N'-hexamethylene-bis-(2-carbamoyl-2-oxazoline), 2,2'-methylene-bis-(2-oxazoline), 2,2'-ethylene-bis-(2-oxazoline), 2,2'-propylene-bis-(2-oxazoline), 1,3-phenylene-bis-(2-oxazoline), 2,2-p-phenylene-bis-(2-oxazoline) and a mixture of at least two of them is further added in amount of 10 parts by weight or less relative to a total of 100 parts by weight of the acid component mixture and the aliphatic glycol.

7. The aliphatic/aromatic copolyester resin composition according to claim 1, wherein, on esterification or transesterification, a carbodiimide compound selected from the group consisting of 1,3-dicyclohexylcarbodiimide, bis-(2,6-diisopropyl-phenylene-2,4-carbodiimide), poly-(1,3,5-triisopropyl-phenylene-2,4-carbodiimide) and a mixture of at least two of them is further added in amount of 10 parts by weight or less relative to a total of 100 parts by weight of the acid component mixture and the aliphatic glycol.

8. The aliphatic/aromatic copolyester resin composition according to claim 1, wherein, on esterification or transesterification, an isocyanate based compound selected from the group consisting of 1,6-hexamethylenediisocyanate, isophoronediisocyanate, 4,4'-diphenylmethanediisocyanate, 2,2'-diphenylmethanediisocyanate and a mixture of at least two of them is further added as a chain extender in amount of 5 parts by weight or less relative to a total of 100 parts by weight of the acid component mixture and the aliphatic glycol.

9. The aliphatic/aromatic copolyester resin composition according to claim 1, wherein the composition has a number-average molecular weight of from 30,000 to 60,000 and the weight-average molecular weight of from 50,000 to 300,000, and a melting point of from 80 to 150° C.

10. An injection or extrusion molded article comprising the aliphatic/aromatic copolyester resin composition according to claim 1.

11. A compounded composition prepared by adding starch, calcium carbonate or talc to the aliphatic/aromatic copolyester resin composition according to claim 1.

12. The aliphatic/aromatic copolyester resin composition according to claim 2, wherein, on esterification or transesterification, an isocyanate based compound selected from the group consisting of 1,6-hexamethylenediisocyanate, isophoronediisocyanate, 4,4'-diphenylmethanediisocyanate, 2,2'-diphenylmethanediisocyanate and a mixture of at least two of them is further added as a chain extender in amount of 5 parts by weight or less relative to a total of 100 parts by weight of the acid component mixture and the aliphatic glycol.

13. The aliphatic/aromatic copolyester resin composition according to claim 2, wherein the composition has a number-average molecular weight of from 30,000 to 60,000 and the weight-average molecular weight of from 50,000 to 300,000, and a melting point of from 80 to 150° C.

14. The aliphatic/aromatic copolyester resin composition according to claim 3, wherein, on esterification or transesterification, an isocyanate based compound selected from the group consisting of 1,6-hexamethylenediisocyanate, isophoronediisocyanate, 4,4'-diphenylmethanediisocyanate, 2,2'-diphenylmethanediisocyanate and a mixture of at least two of them is further added as a chain extender in amount of 5 parts by weight or less relative to a total of 100 parts by weight of the acid component mixture and the aliphatic glycol.

15. The aliphatic/aromatic copolyester resin composition according to claim 3, wherein the composition has a number-average molecular weight of from 30,000 to 60,000 and the weight-average molecular weight of from 50,000 to 300,000, and a melting point of from 80 to 150° C.

16. The aliphatic/aromatic copolyester resin composition according to claim 4, wherein, on esterification or transesterification, an oxazoline compound selected from the group consisting of 2,2-bis-(2-oxazoline), N, N'-hexamethylene-bis-(2-carbamoyl-2-oxazoline), 2,2'-methylene-bis-(2-oxazoline), 2,2'-ethylene-bis-(2-oxazoline), 2,2'-propylene-bis-(2-oxazoline), 1,3-phenylene-bis-(2-oxazoline), 2,2-p-phenylene-bis-(2-oxazoline) and a mixture of at least two of them is further added in amount of 10 parts by weight or less relative to a total of 100 parts by weight of the acid component mixture and the aliphatic glycol.

17. The aliphatic/aromatic copolyester resin composition according to claim 16, wherein, on esterification or trans-esterification, an isocyanate based compound selected from the group consisting of 1,6-hexamethylenediisocyanate, isophoronediisocyanate, 4,4'-diphenylmethanediisocyanate, 2,2'-diphenylmethanediisocyanate and a mixture of at least two of them is further added as a chain extender in amount of 5 parts by weight or less relative to a total of 100 parts by weight of the acid component mixture and the aliphatic glycol.

18. The aliphatic/aromatic copolyester resin composition according to claim 16, wherein the composition has a number-average molecular weight of from 30,000 to 60,000 and the weight-average molecular weight of from 50,000 to 300,000, and a melting point of from 80 to 150° C.

19. The aliphatic/aromatic copolyester resin composition according to claim 4, wherein, on esterification or transesterification, an isocyanate based compound selected from the group consisting of 1,6-hexamethylenediisocyanate, isophoronediisocyanate, 4,4'-diphenylmethanediisocyanate, 2,2'-diphenylmethanediisocyanate and a mixture of at least two of them is further added as a chain extender in amount of 5 parts by weight or less relative to a total of 100 parts by weight of the acid component mixture and the aliphatic glycol.

20. The aliphatic/aromatic copolyester resin composition according to claim 4, wherein the composition has a number-average molecular weight of from 30,000 to 60,000 and the weight-average molecular weight of from 50,000 to 300,000, and a melting point of from 80 to 150° C.

21. The aliphatic/aromatic copolyester resin composition according to claim 5, wherein, on esterification or transesterification, an isocyanate based compound selected from the group consisting of 1,6-hexamethylenediisocyanate, isophoronediisocyanate, 4,4'-diphenylmethanediisocyanate, 2,2'-diphenylmethanediisocyanate and a mixture of at least two of them is further added as a chain extender in amount of 5 parts by weight or less relative to a total of 100 parts by weight of the acid component mixture and the aliphatic glycol.

22. The aliphatic/aromatic copolyester resin composition according to claim 5, wherein the composition has a number-average molecular weight of from 30,000 to 60,000 and the weight-average molecular weight of from 50,000 to 300,000, and a melting point of from 80 to 150° C.

23. The aliphatic/aromatic copolyester resin composition according to claim 6, wherein, on esterification or transesterification, an isocyanate based compound selected from the group consisting of 1,6-hexamethylenediisocyanate, isophoronediisocyanate, 4,4'-diphenylmethanediisocyanate, 2,2'-diphenylmethanediisocyanate and a mixture of at least two of them is further added as a chain extender in amount of 5 parts by weight or less relative to a total of 100 parts by weight of the acid component mixture and the aliphatic glycol.

24. The aliphatic/aromatic copolyester resin composition according to claim 6, wherein the composition has a number-average molecular weight of from 30,000 to 60,000 and the weight-average molecular weight of from 50,000 to 300,000, and a melting point of from 80 to 150° C.

25. The aliphatic/aromatic copolyester resin composition according to claim 7, wherein, on esterification or transesterification, an isocyanate based compound selected from the group consisting of 1,6-hexamethylenediisocyanate, isophoronediisocyanate, 4,4'-diphenylmethanediisocyanate, 2,2'-diphenylmethanediisocyanate and a mixture of at least two of them is further added as a chain extender in amount of 5 parts by weight or less relative to a total of 100 parts by weight of the acid component mixture and the aliphatic glycol.

26. The aliphatic/aromatic copolyester resin composition according to claim 7, wherein the composition has a number-average molecular weight of from 30,000 to 60,000 and the weight-average molecular weight of from 50,000 to 300,000, and a melting point of from 80 to 150° C.

* * * * *